United States Patent
West et al.

(10) Patent No.: US 6,354,779 B1
(45) Date of Patent: Mar. 12, 2002

(54) SELF-DRILLING ANCHOR BOLT

(75) Inventors: Robert A. West, Shorewood, MN (US); Alvar L. West, Jackson, MI (US)

(73) Assignee: Westerland Products Corporation, Minnetonka, MN (US)

( * ) Notice: Subject to any disclaimer, the term of this patent is extended or adjusted under 35 U.S.C. 154(b) by 0 days.

(21) Appl. No.: 09/711,220

(22) Filed: Nov. 9, 2000

Related U.S. Application Data

(63) Continuation of application No. 09/190,352, filed on Nov. 12, 1998, now Pat. No. 6,186,716.

(51) Int. Cl.[7] .............................................. F16B 13/04
(52) U.S. Cl. ...................... 411/80.1; 411/80.6; 411/30; 411/419
(58) Field of Search .............................. 411/29, 30, 31, 411/80.1, 80.5, 80.6, 42, 45, 387.1, 387.5–387.8

(56) References Cited

U.S. PATENT DOCUMENTS

| | | |
|---|---|---|
| 1,099,668 A | 6/1914 | Rosenberg |
| 2,026,686 A | 1/1936 | Kirley |
| 3,094,892 A | 6/1963 | Topf |
| 3,318,182 A | 5/1967 | Carlson |
| 3,779,664 A | 12/1973 | Caley et al. |
| 4,322,194 A | 3/1982 | Einhorn ......................... 411/30 |
| 4,601,625 A | 7/1986 | Ernst et al. |
| 4,617,692 A | 10/1986 | Bond et al. |
| 4,708,552 A | 11/1987 | Bustos et al. .................. 411/60 |

(List continued on next page.)

FOREIGN PATENT DOCUMENTS

| | | | |
|---|---|---|---|
| EP | 0539139 | 10/1991 | |
| FR | 1332253 | 6/1963 | ................ 411/80.1 |
| FR | 1577119 | 8/1969 | ................ 411/80.1 |
| NL | 7002127 | 8/1971 | |

OTHER PUBLICATIONS

"Drywall Anchors, Just Screw Right In . . . No Pre–Drilling Required!", Catalog: Improvements, Hundreds of Quick & Clever Problem–Solvers!, 2 pages, (Fall/Winter 1998).
"Exhibit A—Drive Wall Anchors, Medium Duty Anchors for Hollow walls", Hillman Fastener, Cincinnati, OH.
"Exhibit B—Spur Steel–Lok, Upright Hardware Pack—for Masonry and Studded Walls", Spur–USA, Inc., Cincinnati, OH.
"Exhibit C—Hollow Wall Anchors, Medium Duty Anchors for Hollow walls", Hillman Fastener, Cincinnati, OH.
"Exhibit D—Plastic Anchors with screws, Light Duty Anchors for Hollow walls", Hillman Fastener, Cincinnati, OH.
"Exhibit E—EBF–4 Expandet Fasteners", Litho USA.
"Exhibit F—Picture Hook Anchors with Screws", Toggler Anchor System, Elmsford, NY.
"Exhibit G—E–Z Anchor with screws, Light Duty Anchors for Hollow walls, (#8 Zinc)", Hillman Fastener, Cincinnati, OH.

(List continued on next page.)

*Primary Examiner*—Flemming Saether
(74) *Attorney, Agent, or Firm*—Schwegman, Lundberg, Woessner & Kluth, P.A.

(57) ABSTRACT

An anchor bolt is provided which includes a head, a drill portion, and an intermediate shank portion. The intermediate shank portion has a longitudinal cavity formed therein for receiving a mounting set screw. An external thread is formed on the shank portion for threading the anchor bolt into the wall. The shank portion is divided by a slit into at least one portion and the external thread on the shank portion is divided into a plurality of discrete thread segments by the slit. The drill portion has a cutting edge and at least one flute formed therein which also extends to a drill tip and to a sharpened point. The anchor bolt is driven into the wall portion with a screwdriver, and then a mounting set screw is inserted into the longitudinal cavity. When the mounting set screw is inserted into the cavity, the set screw causes a portion of the shank portion to separate from the shank portion to engage with the wall.

13 Claims, 9 Drawing Sheets

U.S. PATENT DOCUMENTS

| | | | |
|---|---|---|---|
| 5,039,262 A | 8/1991 | Giannuzzi | 411/30 |
| 5,160,225 A | 11/1992 | Chern | 411/30 |
| 5,190,425 A | 3/1993 | Wieder et al. | |
| 5,224,805 A | 7/1993 | Moretti et al. | 411/30 |
| 5,529,449 A | 6/1996 | McSherry et al. | 411/31 |
| 5,536,121 A | 7/1996 | McSherry | 411/31 |
| 5,558,479 A | 9/1996 | McElderry | |
| 5,692,864 A | 12/1997 | Powell et al | 411/30 |
| 5,752,792 A | 5/1998 | McSherry | 411/31 |

OTHER PUBLICATIONS

"Exhibit H—E–Z Anchor with screws, Light Duty Anchors for Hollow walls (#8 Plastic)", Hillman Fastener, Cincinnati, OH.

"Exhibit I—The Wall Grabber, Wall Anchors, Shorty Anchor with #8 screw", Grabco Inc., Rolling Meadows, Il, Copy of front and side of wall anchor included.

"Exhibit J—Plastic Anchor Insert".

SELF-DRILLING ANCHOR BOLT

CROSS-REFERENCE TO RELATED APPLICATIONS

This application is a continuation of U.S. Ser. No. 09/190,352 filed Nov. 12, 1998 now U.S. Pat. No. 6,186,716 which is incorporated by reference.

FIELD OF THE INVENTION

The present invention relates generally to self-drilling threaded inserts. More particularly, it pertains to a threaded insert structure which when installed into a wall is adapted to receive a threaded fastener therein, where the threaded insert structure provides an anchor in drywall or sheetrock.

BACKGROUND OF THE INVENTION

When objects or fixtures are to be mounted on a wall, the installer searches for a stud into which a screw or nail can be inserted. However, a stud is not always available or in a convenient place. Where an object is to be mounted in hollow wall construction such as plasterboard, sheetrock, fiberboard or any other material employed in hollow wall construction, the common practice is to use a hollow anchor for this purpose. The conventional hollow anchor is formed of metal such as zinc or of plastic such as PVC, which when hammered into a hole pre-drilled into the wall, is then adapted to receive a threaded fastener or mounting screw that goes through the mounting hole in the object and turns into the hollow of the anchor.

The installation of a conventional anchor entails three distinct operations: 1) drilling a hole, 2) hammering the anchor into the hole, and 3) inserting a threaded fastener into the anchor. The first and most critical step is the drilling of a hole in the wall which must be appropriate to that of the anchor. Should an oversize hole be drilled, then in the next step when the anchor is hammered into the hole, the anchor will not wedge firmly therein. As a consequence, it will not be possible to carry out the third step. In the third step, a threaded fastener is inserted into the hollow portion of the anchor. But if the anchor is loose in the wall hole, this will cause the anchor to turn as the fastener is turned, and the fastener will not be able to thread its way into the anchor.

The installation of a convention hollow anchor typically requires several tools including a drill provided with a drill bit having a diameter appropriate to that of the anchor, a hammer to drive the anchor in the hole drilled in the wall, and a screwdriver to turn the threaded fastener into the anchor or to later remove it from the anchor.

Though hollow wall anchors are used on a large scale by installers, the need to drill holes and then hammer the anchors into the holes is a practical drawback, for these operations are time consuming and impose distinct limits on the number of anchors that can be installed in a given period. In addition, if anchors of different sizes must be installed, then the installer must change the drill bit when switching from one anchor size to another, which, consumes time and reduces the productivity of the installer. Furthermore, when a wall anchor is hammered into a wall, the rear surface of the wall board is often destroyed, thereby minimizing the anchor strength of the wall anchor.

One approach to the above is a self-threading anchor with spreadable distal leg portions joined by a frangible drill end portion described in U.S. Pat. No. 5,692,864 to Powell on Dec. 2, 1997. In the '864 Patent, Powell teaches a spade-shaped drill end portion with a frangible web portion which holds the drill end portion together during drilling while allowing the drill end portion to split apart to accommodate the spreading of the leg portions. Other self drilling and self tapping anchors are described in U.S. Pat. No. 5,536,121 to McSherry on Jul. 16, 1996. However, the cutting portions of these anchors create rough cutting surfaces which decrease the strength of the engagement of any external threads. In addition, the rough cutting creates an unsightly appearance after the anchor is installed.

Accordingly, what is needed is an improved anchor bolt which requires a minimum number of tools to install. What is further needed is an anchor bolt which is aesthetically pleasing once installed, and is not unduly disruptive to a mounting surface. What is also needed is an anchor bolt which is securely mounted within a wall for attaching objects thereto.

SUMMARY OF THE INVENTION

An improved self-drilling plastic anchor bolt is provided which is installable in a wall with a screwdriver. The anchor bolt is adapted to receive a threaded fastener that holds a fixture or other object against the wall, where the anchor bolt dispenses with the need for a drill, a hammer, or any tool other than a screwdriver to install the anchor bolt.

The self-tapping anchor bolt has a head with a through-hole opening for receiving a screwdriver. In one embodiment, the through-hole is adapted to receive a Phillips screwdriver. The head is coupled with a shank at a first end of the shank, where a second end of the shank is coupled with a drill portion. The shank has a longitudinal cavity therein which is adapted to receive a set screw. In addition, the shank includes points of weakness therethrough to accommodate expansion of a portion of the shank after insertion of the set screw. The points of weakness allow for a portion of the shank to deflect away proximate the head. In another embodiment, the points of weakness allow for a portion of the shank to deflect away from the bolt proximate an intermediate portion of the bolt.

An external helical thread on the shank portion is coiled about the external surface of the shank and extends between the head and the drill portion. The drill portion includes a cutting edge and at least one helical flute for carrying away the material during installation of the anchor bolt.

In another embodiment, the self-tapping anchor bolt has a head with a through-hole opening for receiving a screwdriver. The head is coupled with a shank at a first end of the shank portion, where a second end of the shank is coupled with a drill portion. The shank has a longitudinal cavity therein which is adapted to receive a set screw. The longitudinal cavity, in one embodiment, is tapered. In addition, the shank includes slits therethrough to accommodate expansion of the shank after insertion of the set screw. In one embodiment, the points of weakness comprise slits. At least one portion of the shank is adapted to expand outwardly and is separable from the shank proximate the head. The portion of the shank, when partially severed from the shank upon insertion of the set screw, secures the anchor bolt within the wall. In one embodiment, an external helical thread on the shank portion is coiled about the external surface of the shank portion and extends between the head and the drill portion. The external thread allows for the anchor bolt to engage with the mounting surface before the set screw is installed. In another embodiment, the drill portion includes a cutting edge and at least one helical flute for carrying away the material during installation of the anchor bolt.

To install the anchor bolt, first a sharpened point on the drill tip is used to pierce the mounting surface. A screwdriver is then used to drill the anchor bolt into the wall. After the anchor bolt is inserted into the wall such that the head abuts an outer surface of the wall, a mounting set screw is inserted into the longitudinal cavity of the shank portion. A screwdriver is then used to concurrently apply an axial force while rotating the mounting set screw. As the mounting set screw is further installed into the anchor bolt, the set screw places an outward force on the shank, to thereby separate at least one portion of the shank. The at least one portion of the shank expands away to engage firmly into the wall. As the portion of the shank is wedged radially outwardly from the shank portion, the anchor bolt is held firmly within the wall.

Since the anchor bolt can be fabricated from high strength material, the anchor bolt can be manufactured at a relatively low cost. The anchor bolt is held in the wall by the resistance of the external threads on the anchor bolt which engages with the wall, in addition to the engaging member which is radially spreadable upon insertion of the fastener into the anchor bolt to provide a secure device on or to which structure can be securely mounted.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

DESCRIPTION OF THE EMBODIMENTS

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the scope of the present invention. Therefore, the following detailed description is not to be taken in a limiting sense, and the scope of the present invention is defined by the appended claims.

Figure 1A:
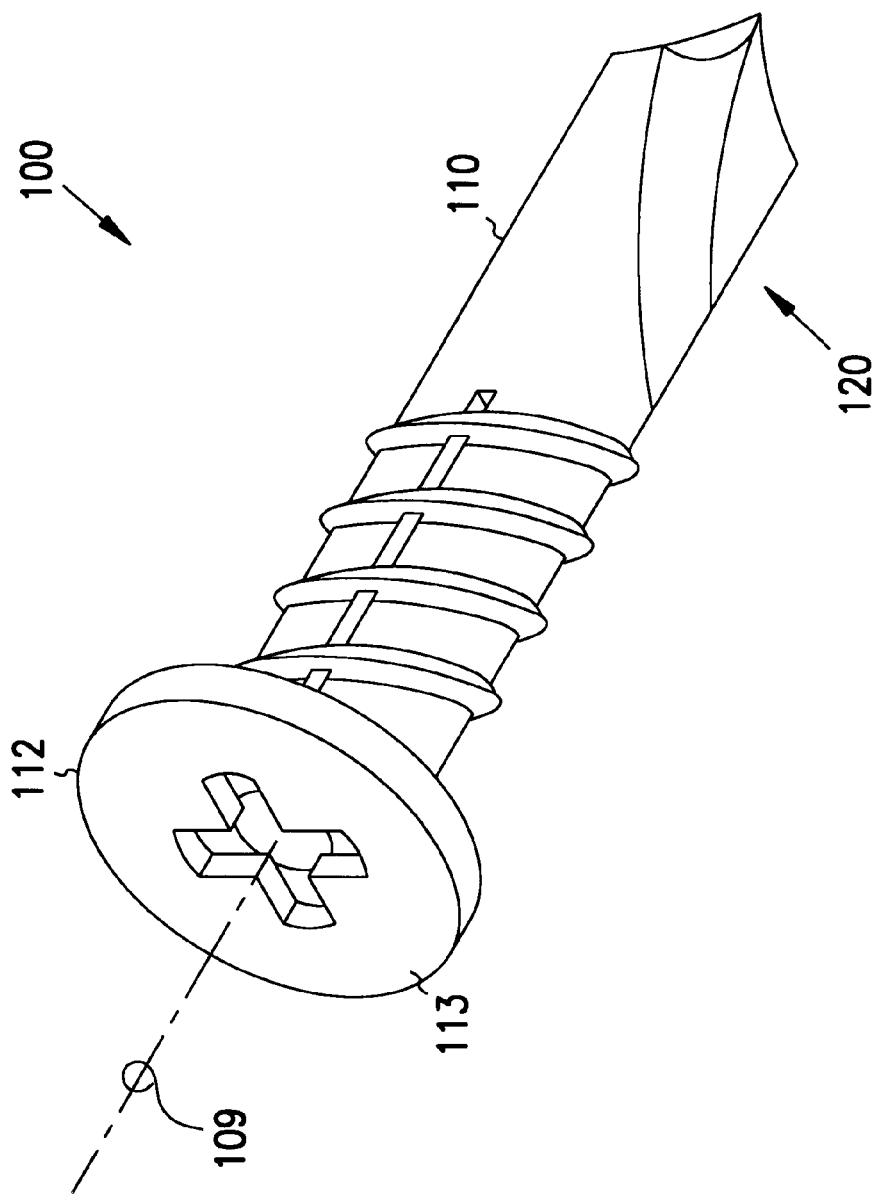
FIG. 1A illustrates a perspective view of an anchor bolt made in accordance with one embodiment of the present invention.

FIG. 1A illustrates one embodiment of an anchor bolt 100. The anchor bolt 100 generally comprises a head 112, a shank 110, and a drill portion 120. The head 112 generally comprises, in one embodiment, a circular flange which extends outward from a radial axis 109 of the shank 110. Alternatively, the head 112 can have other shapes, such as square, rectangular, or square shapes, or can be tapered toward the shank 110. The head 112 can be formed with a flat outer surface 113 such that the anchor bolt 100, if no longer needed, can be plastered over to provide a smooth surface to the mounting surface.

Figure 2:
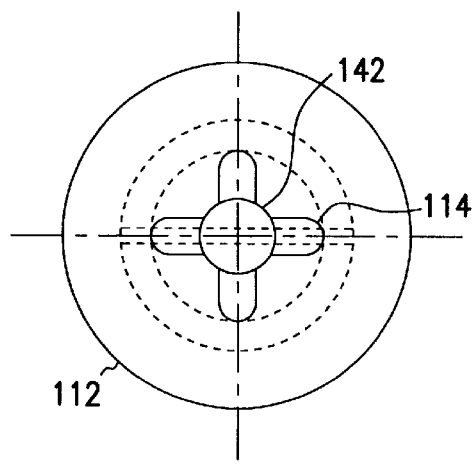
FIG. 2 illustrates a first side elevational view of an anchor bolt made in accordance with another embodiment of the present invention.

FIG. 2 illustrates an end view of the head 112. The head 112 has a through-hole 114 therein for receiving a set screw therethrough. The through-hole 114, in one embodiment is adapted to receive a screwdriver therein. The opening 114 can be aligned with the radial axis 109 of the shank 110 such that axial force directed thereon can be efficiently transmitted to the drill tip, as will be further discussed below. In one embodiment, the through-hole 114 is adapted to receive a Phillips head screwdriver therein. Alternatively, other shapes, for example a flat-head opening, can be incorporated and are considered within the scope of the present invention.

Figure 3:
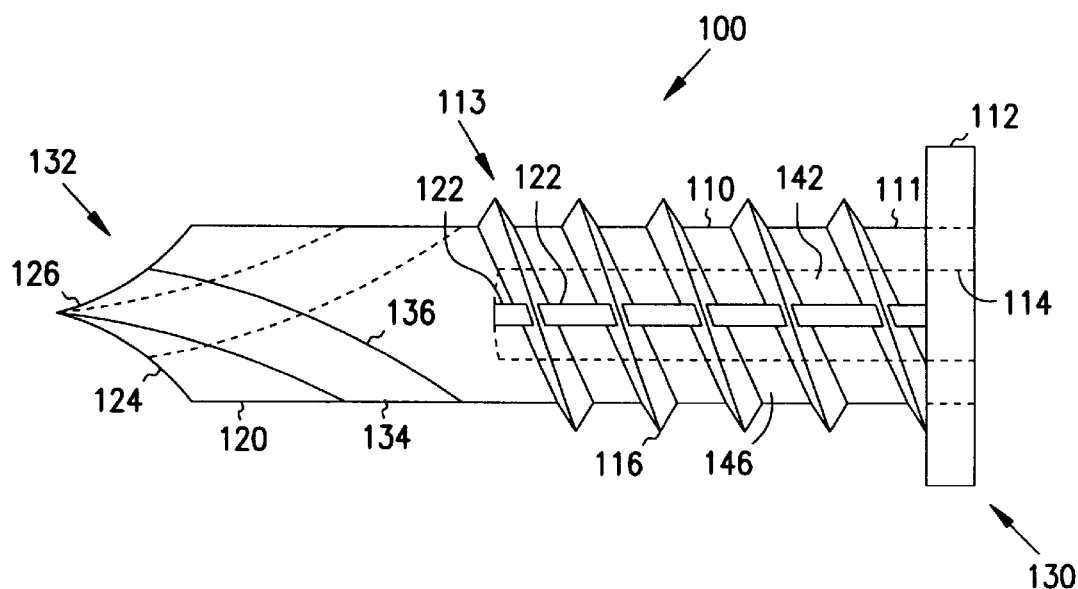
FIG. 3 illustrates a second side elevational view of an anchor bolt made in accordance with one embodiment of the present invention.

Referring to FIG. 3, the shank 110 comprises a generally elongate cylindrical structure which is coupled with the head 112. The shank portion 110, in one embodiment, has external threads 116 which helically coil about the exterior of the shank 110. The external threads 116 assist in tapping and securing the anchor bolt 100 within a wall, as will be further described below. In one embodiment, the shank 110 has at least one point of weakness 123. The points of weakness 123 can be formed in the shank 110 in a variety of manners resulting in several different structures. For instance, the points of weakness 123 can be formed by providing a thinner wall structure for a portion of the shank 110. The shank 110 has, in another embodiment, a plurality of slits 122 therein. Alternatively, at least one slit 122 can be used in the present invention and formed in many different configurations as will be further described below. In one embodiment, the slits 122 extend longitudinally down the shank 110 and divide the external threads 116 into a plurality of discrete segments. The slits 112, in another embodiment, extend through the shank portion such that the slits 112 are substantially parallel with the radial axis of the shank 110. The purpose of the slits 112 and the points of weakness 123 are to weaken a connection of at least one portion 146 of the shank 110 so that the portion 146 of the shank 110 can separate upon insertion of a threaded fastener. Either the slits 112 or the points of weakness 123, or a combination of them can be used within the present invention.

The shank 110, in one embodiment, extends from a first end 111 proximate the head 112 to a second end 113 proximate the drill portion 120. The at least one portion 146 of the shank 110 is defined in part by the points of weakness 123 or the slits 122 and the head 112. Upon insertion of a fastener, at least one portion 146 of the shank will separate from head 112 and the shank 110, and at least one portion of the shank 110 will remain connected with the head 112. Alternatively, in another embodiment, a plurality of portions 146 of the shank 110 can separate from the shank 110 and the head 112 and still be considered within the scope of the invention. The at least one portion 146 of the shank disengages from the shank 110 upon the insertion of the mounting set screw. As the set screw is inserted through the hole 114 and into the longitudinal cavity 142, the at least one portion 146 of the shank pivots away from the first end 130 of the shank 110 at pivot point 148. Alternatively, in another embodiment, the at least one portion 146 bends outward from the shank 110. In yet another configuration, the at least one portion 146 curls outward from the shank 110.

Figure 1B:
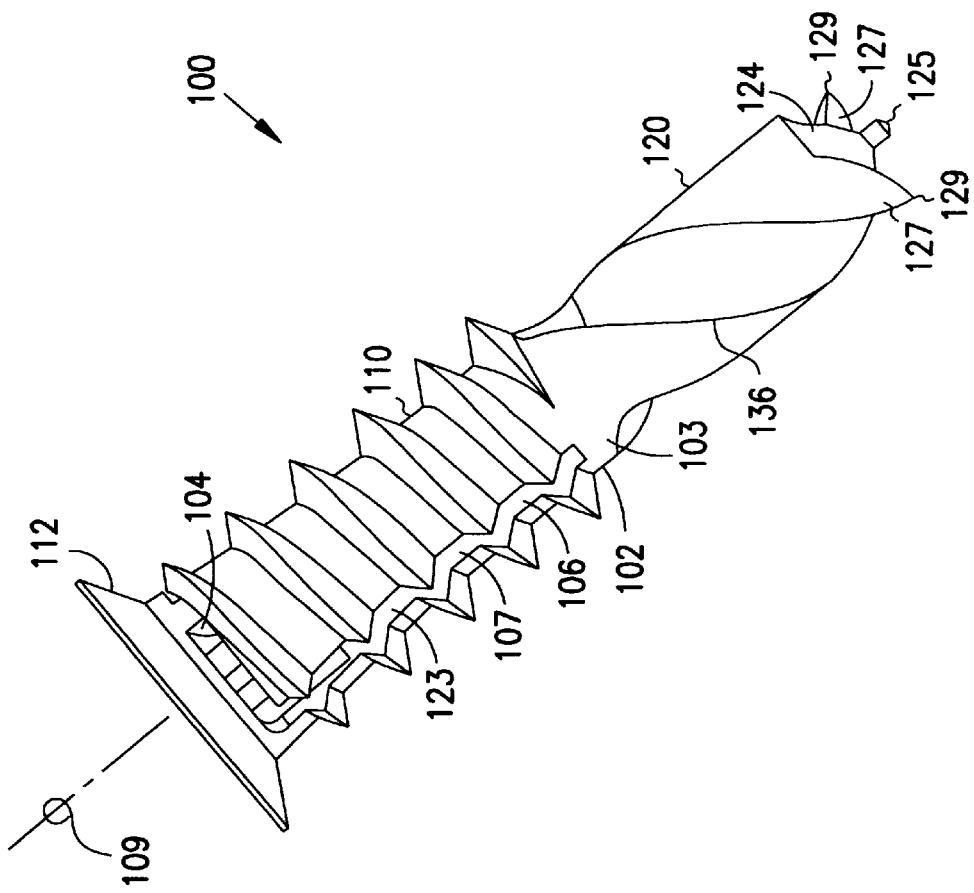
FIG. 1B illustrates a perspective view of an anchor bolt made in accordance with another embodiment of the present invention.

FIG. 1B illustrates another embodiment illustrating an area of weakness 123. The area of weakness 123 comprises a slot 107 which includes a first portion 106 and a second portion 104. The first portion 106 extends longitudinally along the shank 110 and is coupled with the second portion 104. In one embodiment, the first portion 106 extends from proximate the head 112 to an intermediate portion 102 of the anchor bolt 100, where a hinge point 103 is formed proximate to the intermediate portion 102. The second portion 104, in one embodiment, is disposed perpendicular to the first portion 106. In another embodiment, the shank 110 includes two slots 107.

Referring again to FIG. 3, the shank portion 110 also has a longitudinal cavity 142 therein. In one embodiment, the longitudinal cavity 142 is connected with the through-hole 114. The longitudinal cavity 142 is adapted to receive a mounting set screw 144 therein, as will be further discussed below. The longitudinal cavity 142, in one embodiment, is generally aligned with the radial axis of the shank portion 110. In another embodiment, the longitudinal cavity 142 is aligned with the slits 122. The width and the depth of the longitudinal cavity 142 can be modified to accommodate a wide variety of threaded fasteners therein.

The anchor bolt 100 extends from a first end 130 to a second end 132. Proximate to the first end 130 is the shank 110, and proximate the second end 132 is the drill portion 120. The drill portion 120 has, in one embodiment, a smaller diameter than the shank 110. The drill portion 120, in another embodiment, comprises a drill bit. The drill portion 120 extends from proximate the shank 110 to a drill tip 124. The drill tip 124, in one embodiment, is sharpened to a point 126. The point 126 of the drill tip 124 is sharpened to assist in the installation process. In another embodiment, as illustrated in FIG. 1B, the drill tip 124 has a sharpened projection 125 in combination with extended cutting features 127 of the drill portion 120. The sharpened projection, in one embodiment, is aligned with the radial axis 109 of the anchor bolt 100. The extended cutting features 127 extend from the drill portion to a point 129. The extended cutting features 127 allow for the anchor bolt 100 to self-tap into a wall, and eliminate the need for extra tools, such as a drill, when installing the anchor bolt. The sharpened projection 125 assists in centering the anchor bolt 100 as the extended cutting features 127 engage with the wall. In addition, the sharpened projection 125 prevents the anchor bolt 100 from wandering during installation of the anchor bolt 100 into the wall.

In another embodiment, the drill portion 120 has substantially the same length as the shank 110. The drill portion 120 has cutting edges 136 formed at the periphery of the cylindrical drill portion 120. The cutting edges 136 define a portion of helical flutes 134 which are formed in the drill portion 120. The flutes 134 allow for the release of material as the drill portion 120 is drilled into a wall.

Figure 4:
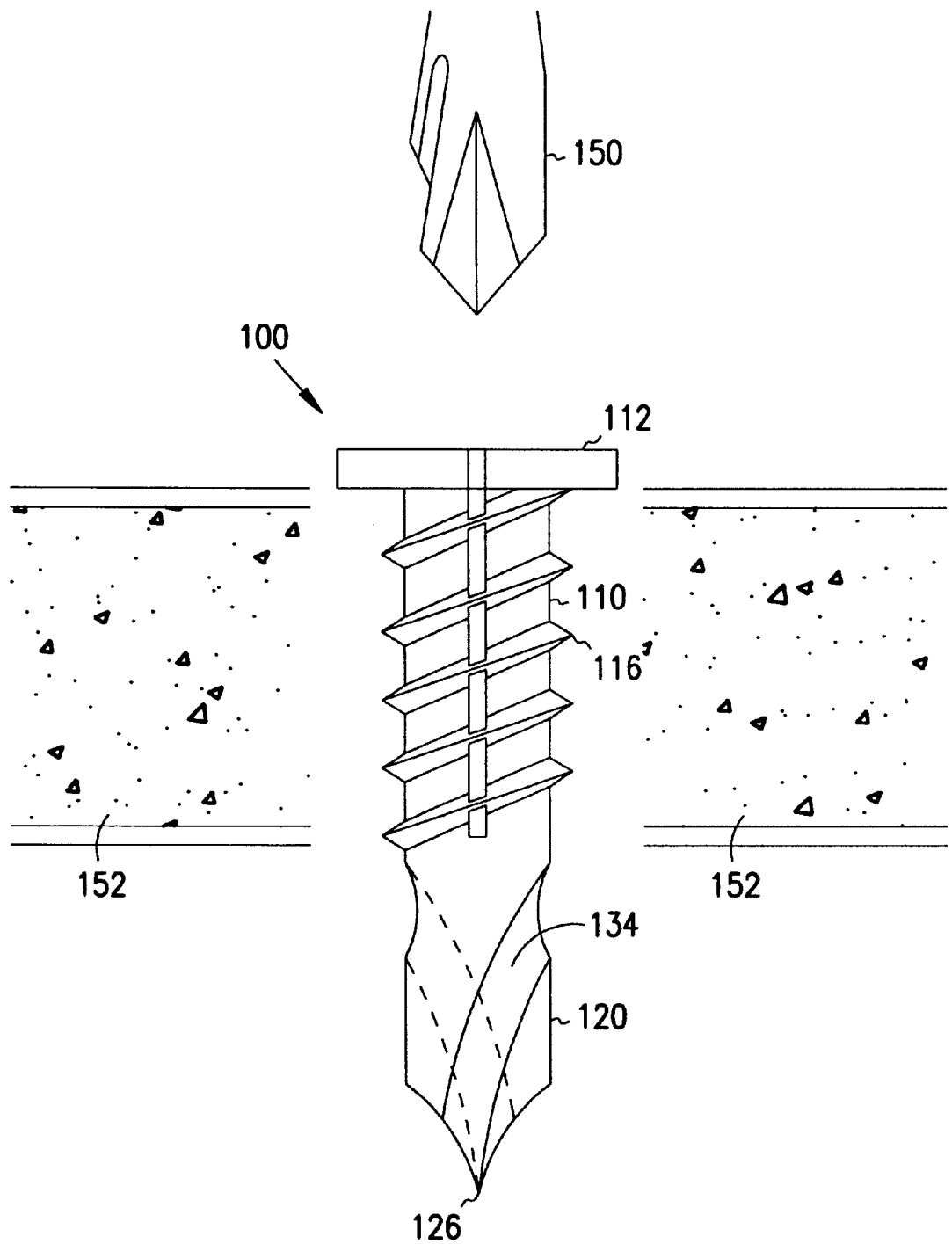
FIG. 4 illustrates an anchor bolt.

FIG. 4 illustrates installation of the anchor bolt 100 into a wall 152. The point 126 of the drill portion 120 is used to pierce an outer surface of the wall 152. A screwdriver 150 is then used to rotate the anchor bolt 100 and simultaneously place an axial force on the anchor bolt 100. As the anchor bolt 100 is turned, and the axial force is applied, the cutting edges 136 of the drill portion 120 cut into the wall 152 forming a bore therein. Material from cutting of the wall is transferred away from the cutting edges 136 by the flutes 134, thereby providing a clean cut in the wall 152. As the anchor bolt 100 is further inserted into the wall 152, the external threads 116 of the shank portion 110 cut a helical thread into the wall 152 and secure the anchor 100 within the wall 152. Installation of the anchor bolt 100 into the wall 152 is complete when the head 112 abuts or is proximately disposed to the outer surface of the wall 152, as shown in FIG. 4.

Figure 5:
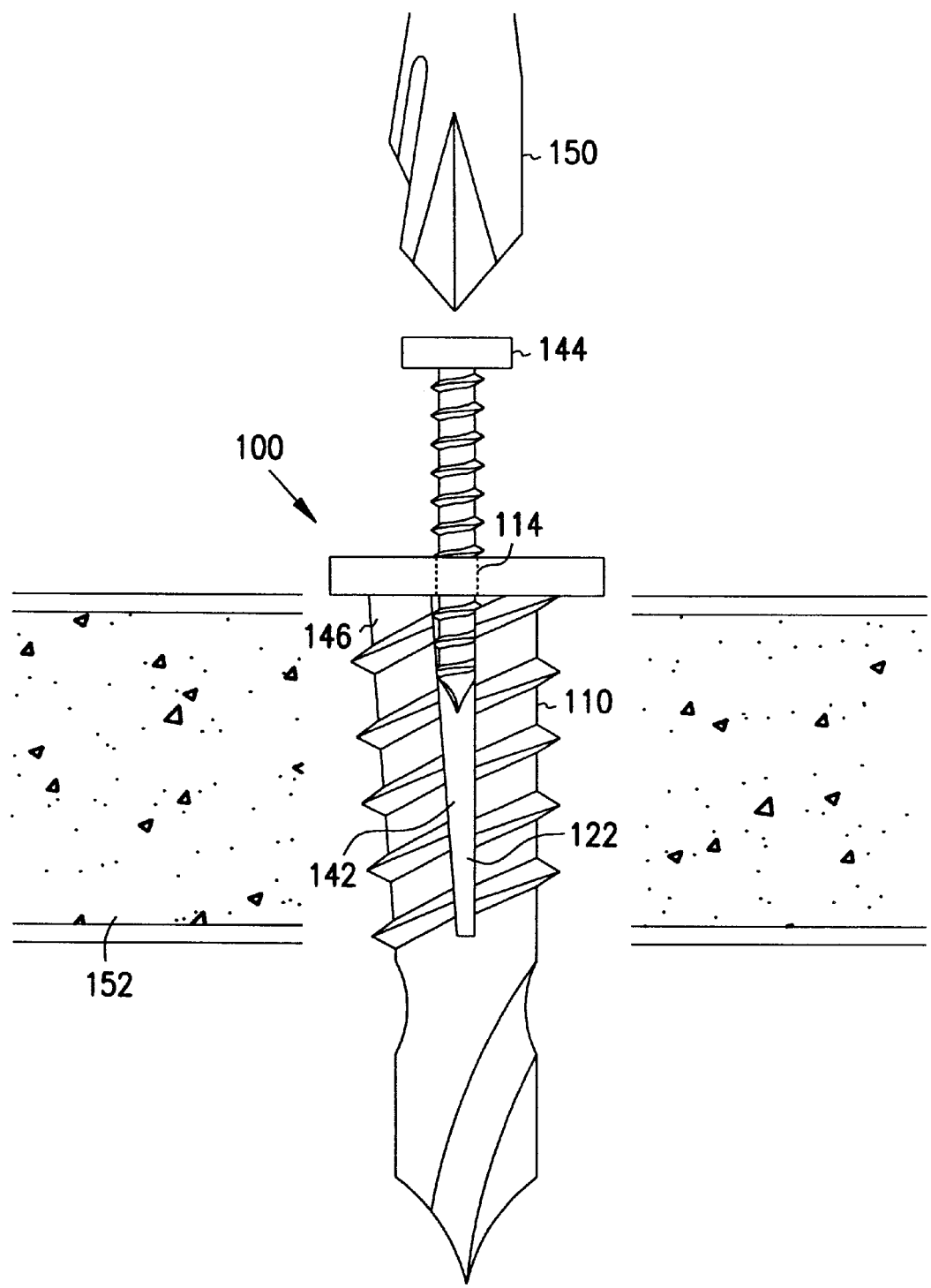
FIG. 5 illustrates a side elevational view of an anchor bolt.
Figure 6:
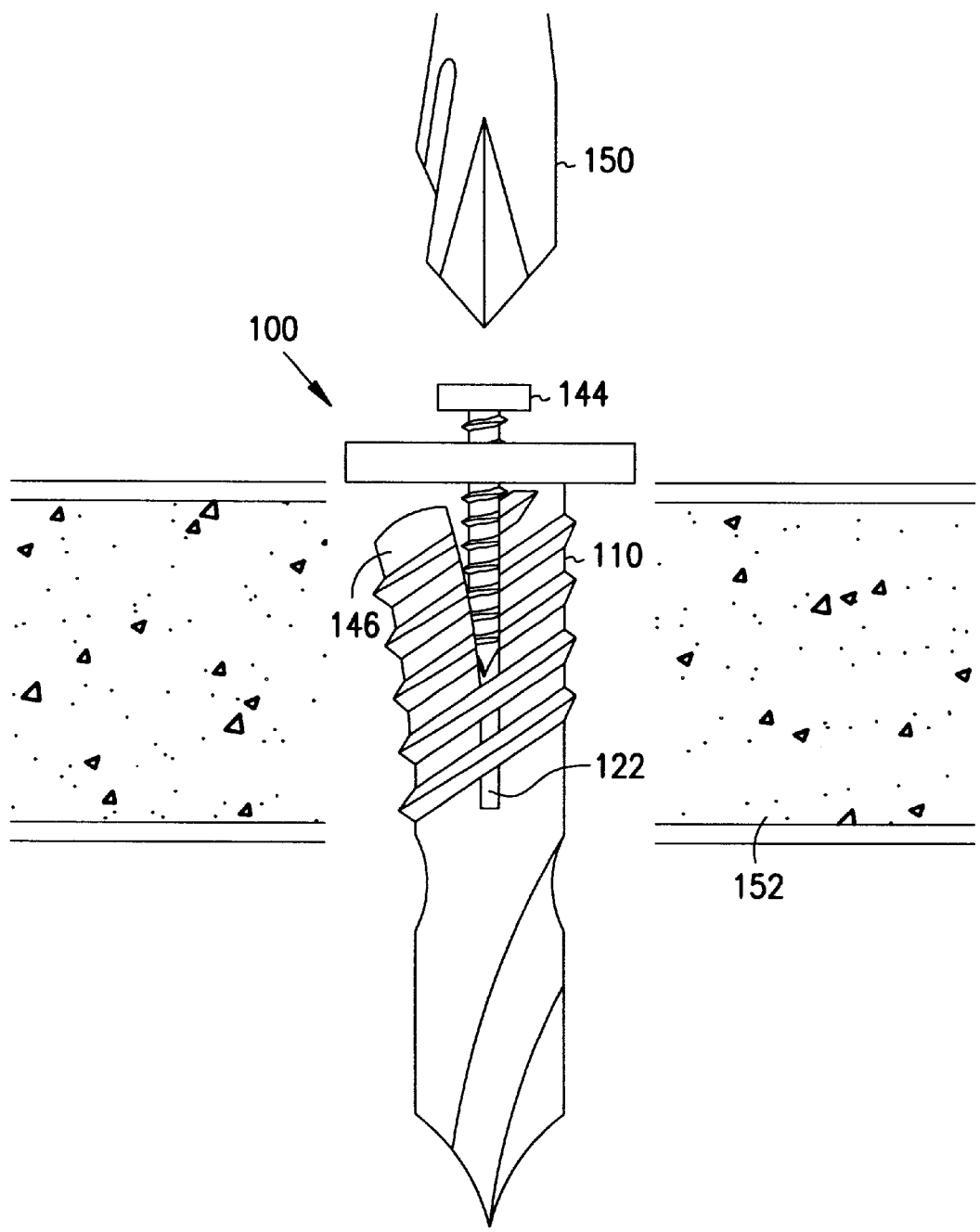
FIG. 6 illustrates a side elevational view of an anchor bolt.

FIGS. 5 and 6 illustrate installation of the mounting set screw 144. After the anchor bolt 100 is inserted into the wall 152 such that the head 112 abuts an outer surface of the wall 152, the mounting set screw 144 is inserted through the hole 114 and into the longitudinal cavity 142 of the shank 110. A screwdriver 150 is then used to apply an axial force and rotate the mounting set screw 144. As the mounting set screw 144 is further installed into the anchor bolt 100, the set screw 144 places an outward force on the shank portion 110. The force from the set screw 144 causes a crack to initiate in the shank portion 110 causing the at least one portion 146 of the shank 110 to split away from the shank 110 proximate to the point of weakness or the slits 122. The at least one portion 146 of the shank 110 is no longer coupled with the head 112 and is expanded away from the shank 110 to engage firmly into the wall 152. As the at least one portion 146 of the shank 110 is wedged radially outwardly from the shank 110, the anchor bolt 100 is held firmly within the wall 152.

Figure 7A:
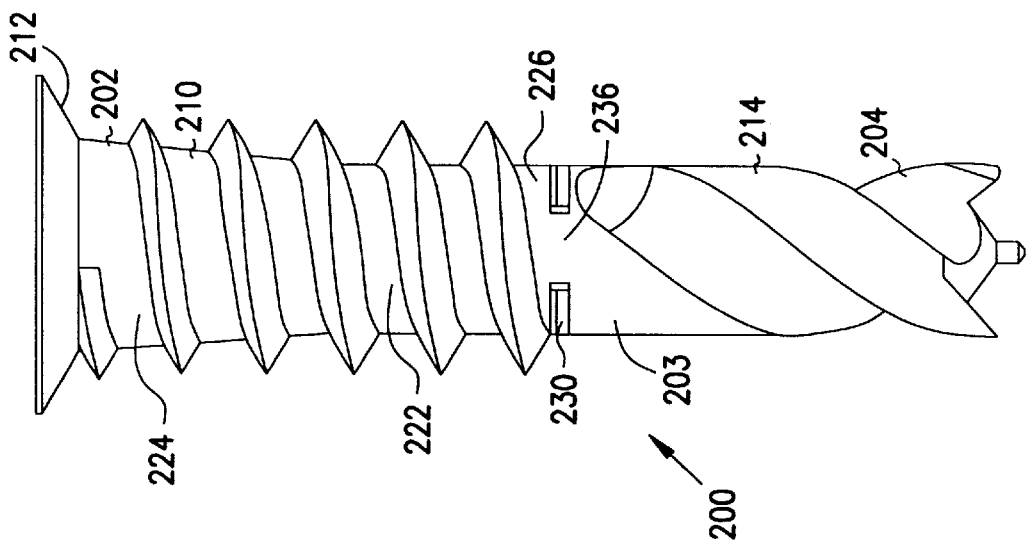
FIG. 7A illustrates a side elevational view of an anchor bolt made in accordance with yet another embodiment of the present invention.
Figure 7B:
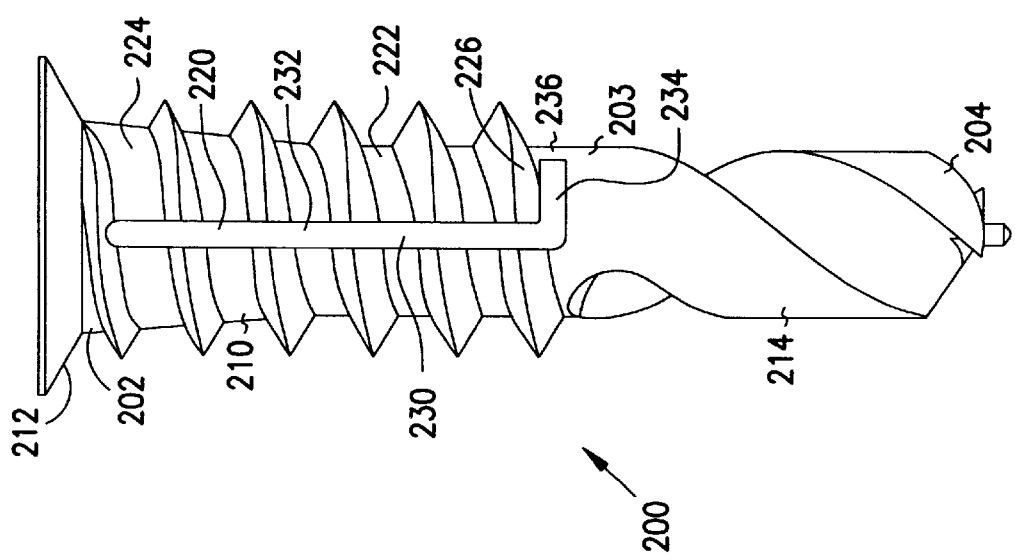
FIG. 7B illustrates a side elevational view of an anchor bolt made in accordance with another embodiment of the present invention.

FIGS. 7A and 7B illustrate another embodiment of an anchor bolt 200. The anchor bolt 200 generally includes a head 212, a shank 210, and a drill portion 214, as discussed in the earlier embodiments, and also include the variations discussed above. The anchor bolt 200 extends from a first end 202, proximate to the head 212, to a second end 204, proximate to the distal end of the drill portion 214, and includes an intermediate portion 203 disposed in between the first end 202 and the second end 204. In one embodiment, the intermediate portion 203 is disposed between the shank 210 and the drill portion 214.

An area of weakness 220 is formed in the anchor bolt 200, and in one embodiment, extends from the first end 202 to the intermediate portion 203. The area of weakness 220 allows for at least one deflecting portion 222 to bend outward at a hinge point 224 proximate the head 212. The deflecting portion 222 includes a distal end 226 which is adapted to engage with the wall 228, as shown in FIG. 8B and retain the anchor bolt 200 within the wall 228. The distal end 226 of the deflecting portion 222, before it is expanded by a set screw, is disposed at the intermediate portion 203 of the anchor bolt 200. In one embodiment, the area of weakness comprises a slot 230.

Figure 8:
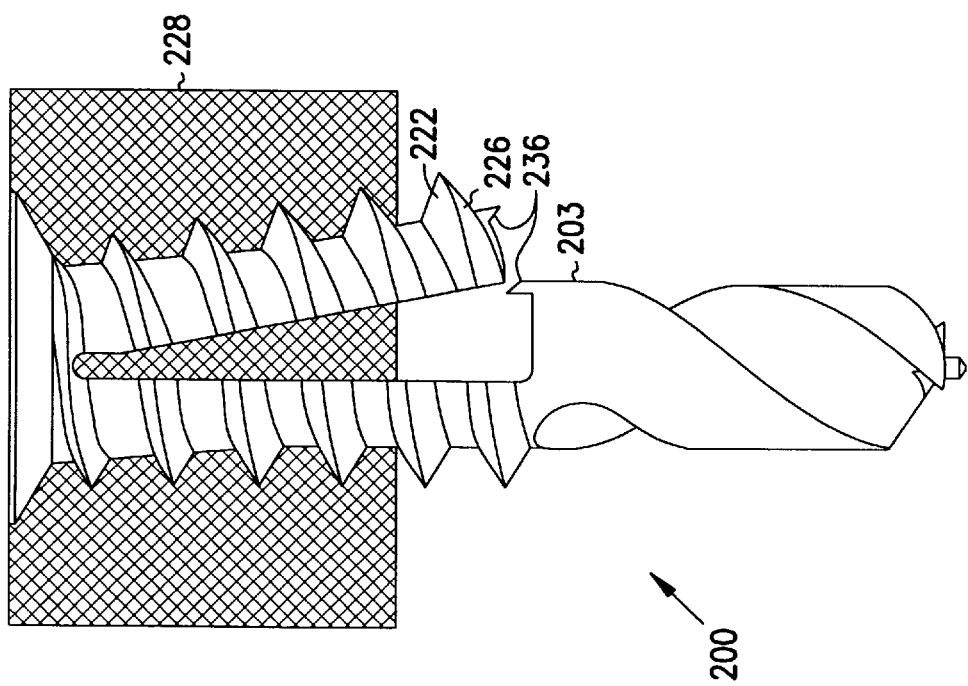
FIG. 8 illustrates a side elevational view of an expanded anchor bolt mads in accordance with another embodiment of the present invention.

The slot 230, in another embodiment, is comprised of a first portion 232 coupled with a second portion 234, and in one embodiment, the first portion 232 is perpendicularly disposed to the second portion 234. The first portion 232 is disposed longitudinally along the anchor bolt 200, and in one embodiment, is disposed completely through the anchor bolt 200. The second portion 234, in another embodiment, extends from the first portion 232 and is disposed at least partially through the intermediate portion 203 of the anchor bolt 200, where a tab 236 of material remains. As a set screw is inserted into the anchor bolt 200, the tab 236 is severed, as shown in FIG. 8, by the force of the inserted set screw.

Figure 9:
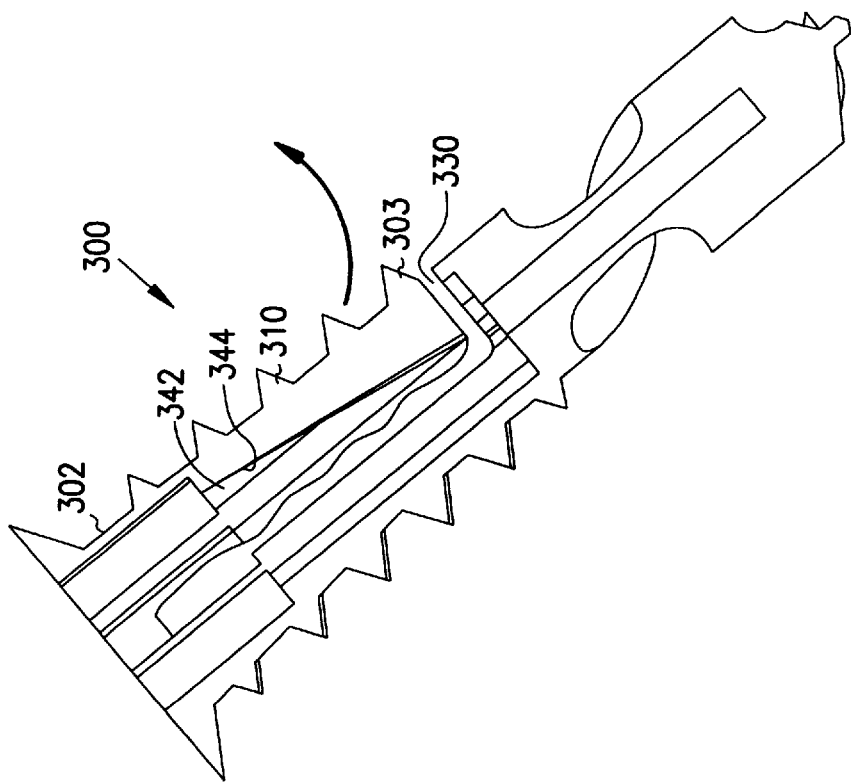
FIG. 9 illustrates a cross-sectional view of an anchor bolt made in accordance with another embodiment of the present invention.

FIG. 9 illustrates yet another embodiment of an anchor bolt 300. The anchor bolt 300 includes similar features as discussed above, where the anchor bolt 300 is adapted to deflect at an intermediate portion 303. In addition, the shank portion 310 has a longitudinal cavity 342 therein. The longitudinal cavity 342 is adapted to receive a mounting set screw therein, as discussed above. The longitudinal cavity 342, in one embodiment, is generally aligned with the radial axis of the shank portion 310, and extends from the first portion 302 to the intermediate portion 303. In another embodiment, the longitudinal cavity 342 has an internal surface 344 which is tapered toward the radial axis of the anchor bolt 300 from the first portion 302 toward the intermediate portion 303. In an alternative embodiment, the tapered internal surface 344 is tapered toward an area of weakness 330. It should be noted, however, that the width and the depth of the longitudinal cavity 342 can be modified to accommodate a wide variety of threaded fasteners therein. The tapered surface of the longitudinal cavity 342 can also be incorporated with other embodiments discussed herein.

Figure 10:
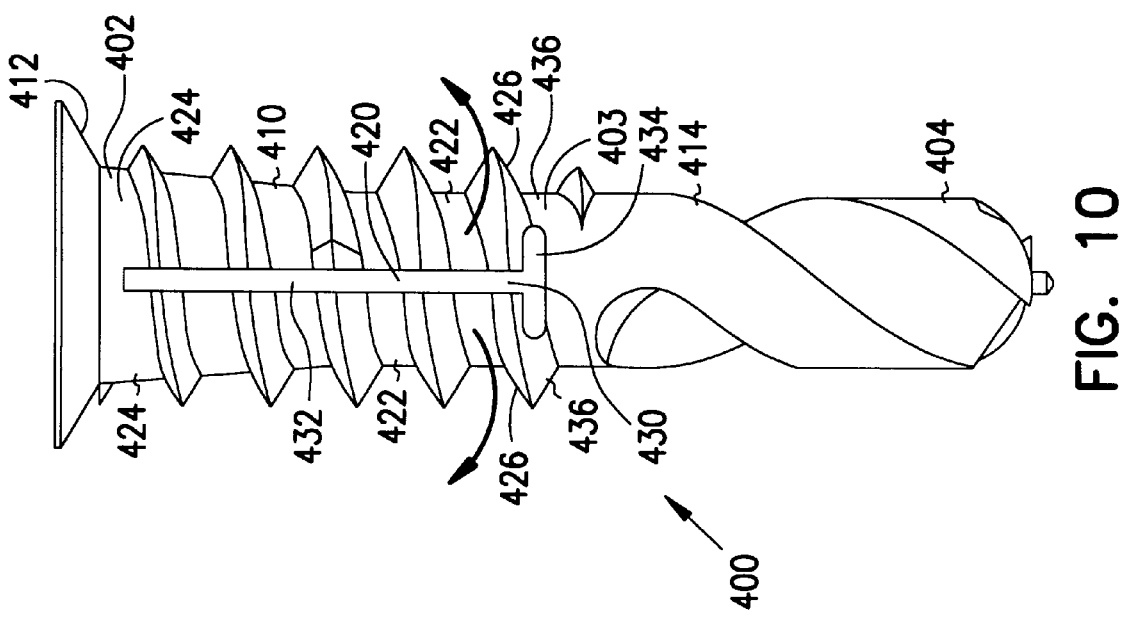
FIG. 10 illustrates a side elevational view of an anchor bolt made in accordance with another embodiment of the present invention.

FIG. 10 illustrates another embodiment of an anchor bolt 400, which generally includes a head 412, a shank 410, and a drill portion 414, as discussed in the earlier embodiments, and also include the variations discussed above. The anchor bolt 400 extends from a first end 402, proximate to the head 412, to a second end 404, proximate to the distal end of the drill portion 414, and includes an intermediate portion 403 disposed in between the first end 402 and the second end 404. In one embodiment, the intermediate portion 403 is disposed between the shank 410 and the drill portion 414.

An area of weakness 420 is formed in the anchor bolt 400, and in one embodiment, extends from the first end 402 to the intermediate portion 403. The area of weakness 420 allows for a plurality of deflecting members 422 to bend outward at a respective hinge point 424 proximate the head 412. The deflecting members 422 each include a distal end 426 which is adapted to engage with the wall to retain the anchor bolt 400 within the wall 428. The distal end 426 of the deflecting members 422, before it is expanded by a set screw, is disposed at the intermediate portion 403 of the anchor bolt 400. In one embodiment, the area of weakness 420 comprises a slot 430.

Figure 11:
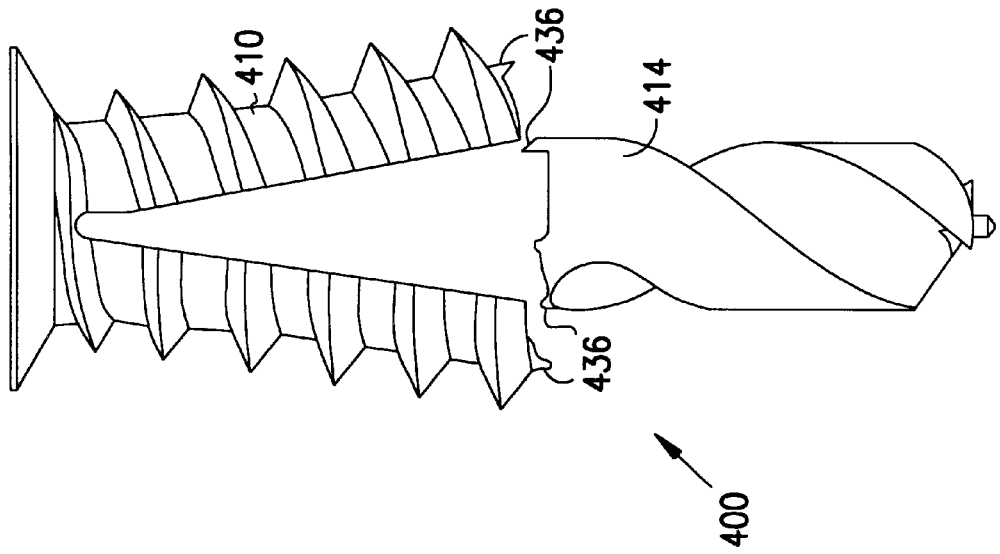
FIG. 11 illustrates a side elevational view of an expanded anchor bolt made in accordance with another embodiment of the present invention.

The slot 430 is comprised of a first portion 432 coupled with a second portion 434, and in one embodiment, the first portion 432 is perpendicularly disposed to the second portion 434, and the first portion 432 relative to the second portion form a T-shape. The first portion 432 is disposed longitudinally along the anchor bolt 400, and in one embodiment, is disposed completely through the anchor bolt 400. The second portion 434, in another embodiment, extends from the first portion 432 and is disposed at least partially through the intermediate portion 403 of the anchor bolt 400, where a tab 436 of material remains. As a set screw is inserted into the anchor bolt 400, the tabs 436 are severed, as shown in FIG. 11, by the force of the inserted set screw. When the tabs 436 are severed, the shank 410 is separated from the drill portion 414.

Advantageously, an improved self-drilling plastic anchor bolt is provided which is installable in a wall with a screwdriver. The anchor bolt is adapted to receive a threaded fastener that holds a fixture or other object against the wall, where the anchor bolt dispenses with the need for a drill, a hammer, or any tool other than a screwdriver to install the anchor bolt. The same screwdriver can be used to install the shank and drill portion as the mounting set screw. The anchor bolt can be fabricated from high strength material, such as a thermoplastic material, which can be manufactured at a relatively low cost. Alternatively, the anchor bolt can be fabricated from other high strength materials, such as a metal. The anchor bolt is held in the wall by the resistance of the external threads on the anchor bolt which engages with the wall, in addition to the engaging member which is radially spreadable upon insertion of the fastener into the anchor bolt.

It is to be understood that the above description is intended to be illustrative, and not restrictive. Many other embodiments will be apparent to those of skill in the art upon reviewing the above description. For example, the helix angles of the flutes may vary. The scope of the invention should, therefore, be determined with reference to the appended claims, along with the full scope of equivalents to which such claims are entitled.

What is claimed is:

1. An anchor bolt comprising:
   a head having an opening, the opening adapted to receive a screwdriver;
   a shank having a first end and a second end, the shank extending from the head at the first end to an intermediate portion of the bolt at the second end, the shank further comprising at least one slot, the slot comprising a first portion and a second portion where the first portion is disposed perpendicular to the second portion, the shank having a longitudinal cavity, the longitudinal cavity extending from proximate the head to the intermediate portion and adapted to receive a set screw; and
   at least one portion of the shank adapted to partially separate from the shank when the longitudinal cavity receives the set screw, where the at least one portion of the shank has an end proximate the intermediate portion adapted to be severed upon insertion of the set screw.

2. The anchor bolt as recited in claim 1, wherein the at least one portion of the shank is adapted to curl outward upon insertion of the set screw.

3. The anchor bolt as recited in claim 1, wherein a plurality of portions of the shank are adapted to partially separate from the shank proximate the intermediate portion.

4. The anchor bolt as recited in claim 1, further comprising a drill portion opposite the head, and an external helical thread on the shank, the helical thread extending between the head and the drill portion.

5. The anchor bolt as recited in claim 4, the drill portion further comprising a cutting edge and at least one helical flute.

6. The anchor bolt as recited in claim 5, where the drill portion extends to a sharpened point.

7. The anchor bolt as recited in claim 1, further comprising a drill portion opposite the head, wherein the drill portion extends to a drill tip, the drill tip comprising a sharpened projection and extended cutting features.

8. The anchor bolt as recited in claim 1, wherein the shank comprises a deflecting member adapted to deflect away from a radial axis of the anchor bolt upon insertion of the set screw.

9. The anchor bolt as recited in claim 9, wherein the deflecting member pivots at a hinge point proximate the head.

10. The anchor bolt as recited in claim 1, wherein the shank comprises a plurality of deflecting members adapted to deflect away from a radial axis of the anchor bolt upon insertion of the set screw.

11. The anchor bolt as recited in claim 1, wherein the longitudinal cavity includes a tapered surface which tapers away from the radial axis of the shank from the second end of the shank to the first end of the shank.

12. The anchor bolt as recited in claim 1, further comprising at least one separable tab disposed on the shank at the intermediate portion, where the at least one separable tab is adapted to separate upon insertion of a set screw.

13. A method for anchoring a fixture to a wall comprising:

piercing a surface of the wall with a sharpened point of an anchor bolt;

rotating the anchor bolt wherein one or more helical flutes on the anchor bolt simultaneously drills a hole in the wall surface until a head of the anchor bolt is proximately disposed to the wall surface and at least a portion of a shank portion of the anchor bolt is threaded within the hole;

inserting a set screw into a longitudinal cavity of the anchor bolt, the shank portion having a slot, the slot comprising a first portion and a second portion where the first portion is disposed perpendicular to the second portion; and rotating the set screw until a deflecting member of the shank portion proximate the head of the bolt is expanded away from a radial axis of the anchor bolt.

* * * * *